(No Model.)  5 Sheets—Sheet 1.
C. ROHN.
GAS ENGINE.
No. 280,083. Patented June 26, 1883.
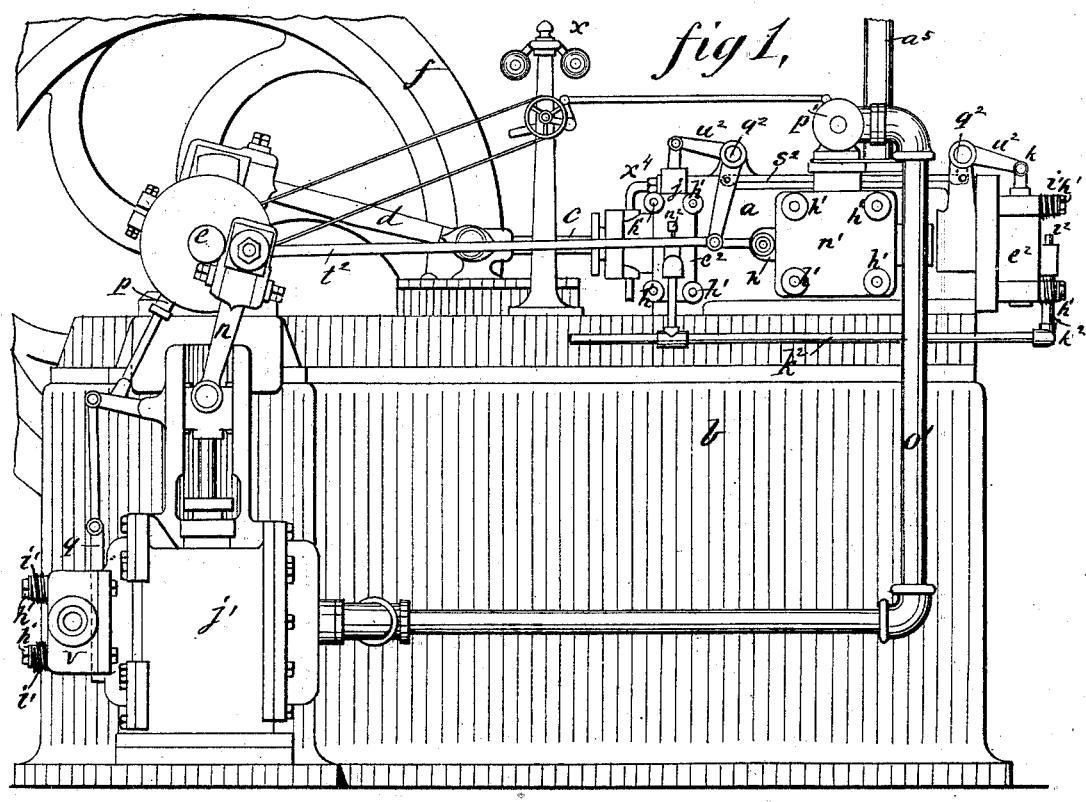
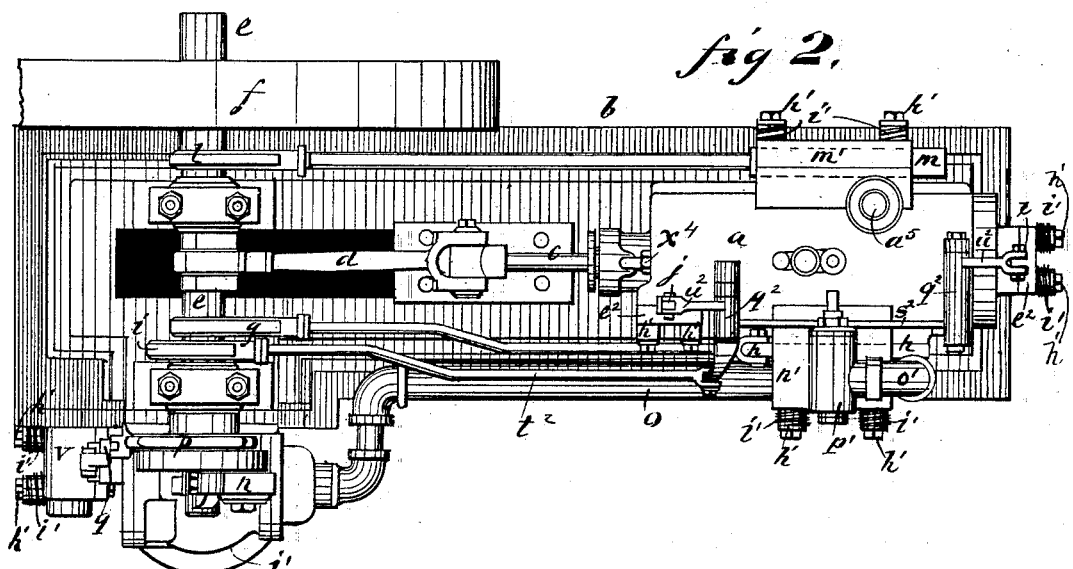
WITNESSES:
INVENTOR:
C. Rohn
BY Munn & Co
ATTORNEYS.

(No Model.) 5 Sheets—Sheet 2.
C. ROHN.
GAS ENGINE.
No. 280,083. Patented June 26, 1883.
*fig 3.*
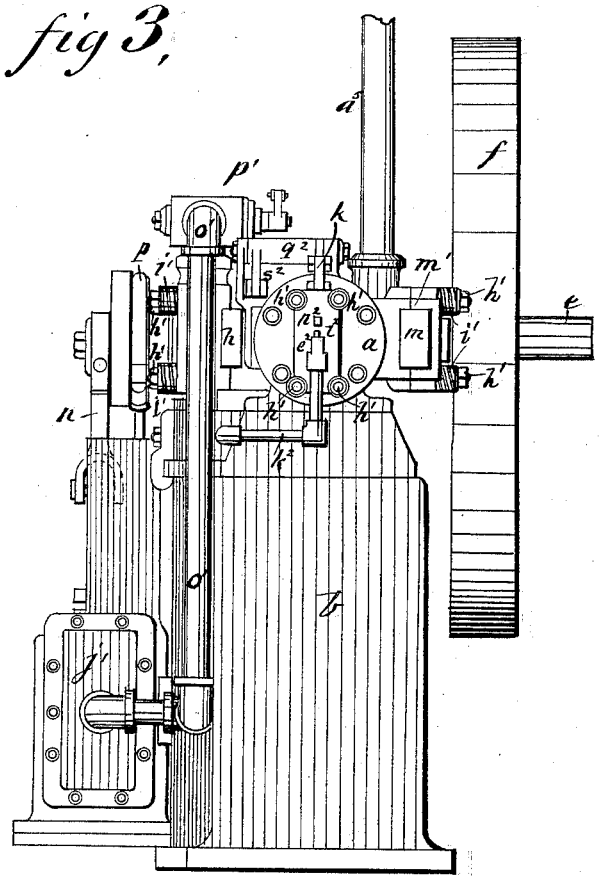
*fig 4.* *fig 5.*
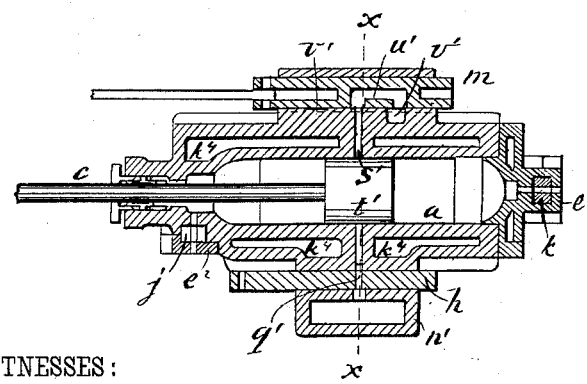 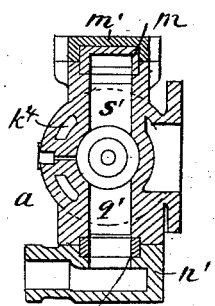
WITNESSES: INVENTOR:
Chas. T. Howell. C. Rohn
C. Sedgwick BY Munn & Co
ATTORNEYS.

(No Model.) 5 Sheets—Sheet 3.
C. ROHN.
GAS ENGINE.
No. 280,083. Patented June 26, 1883.
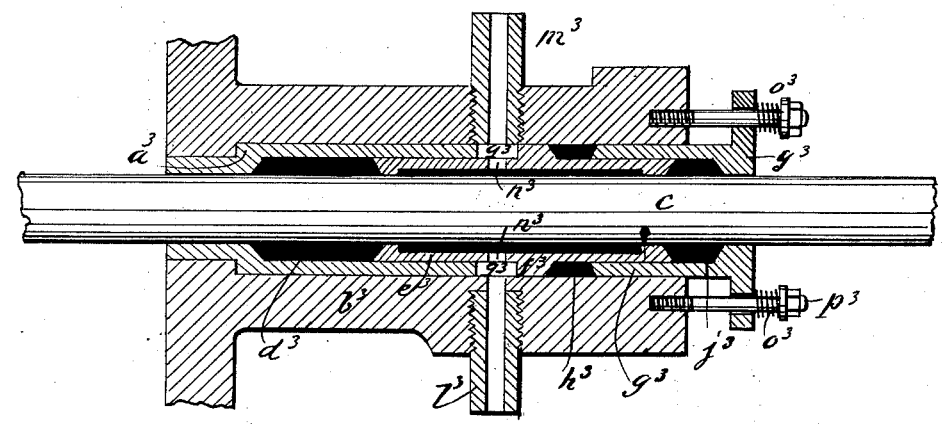
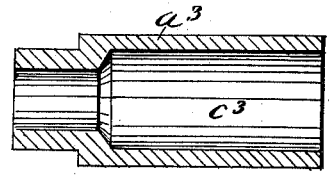
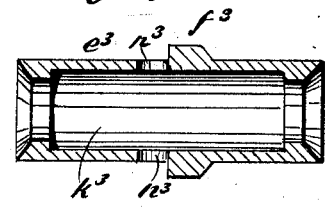
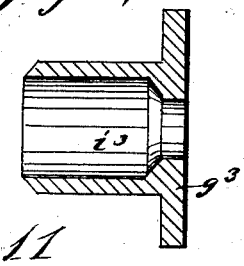
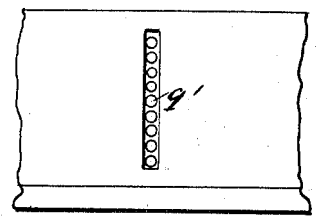
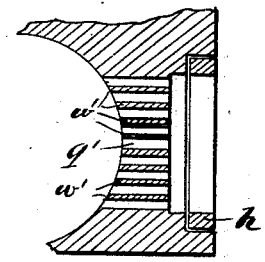
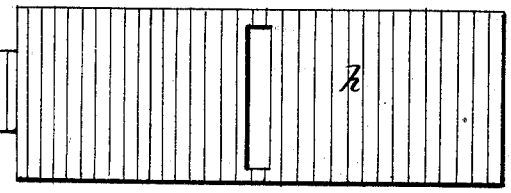
WITNESSES: INVENTOR:
Chas. T. Howell C. Rohn
C. Sedgwick
BY Munn & Co
ATTORNEYS.

Figure 18:
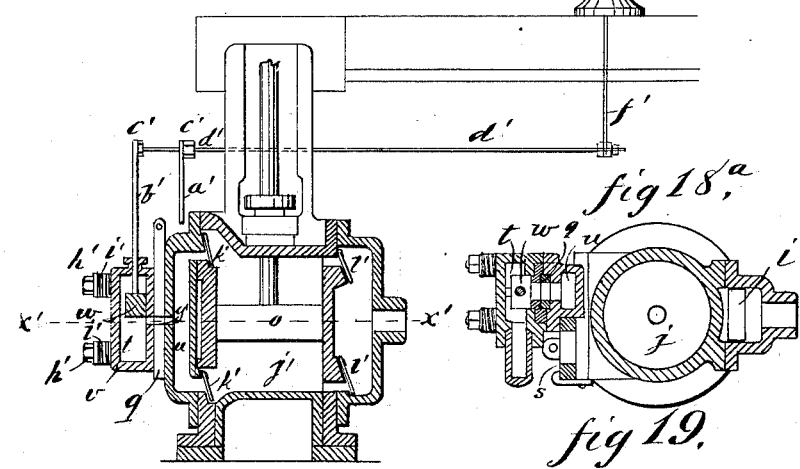
Figure 19:
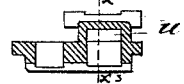
Figure 21:
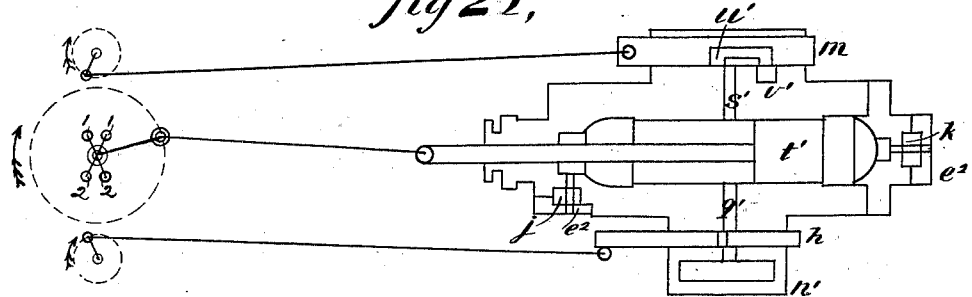
Figure 22:
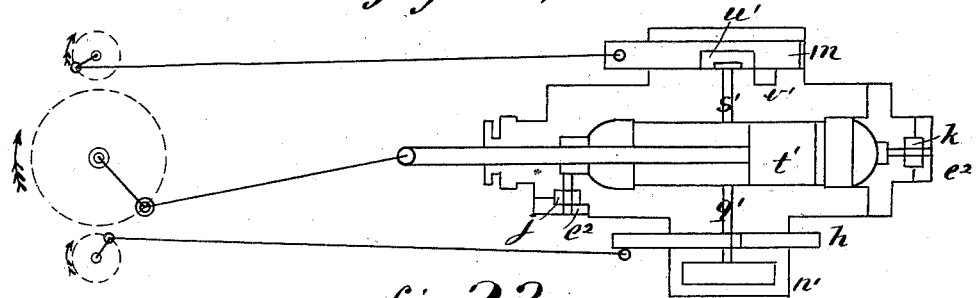

(No Model.) 5 Sheets—Sheet 4.
C. ROHN.
GAS ENGINE.
No. 280,083. Patented June 26, 1883.

fig 18ª 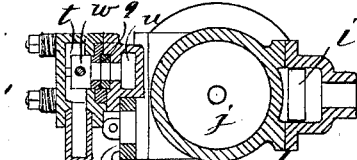

fig 19ᵇ fig 19ª 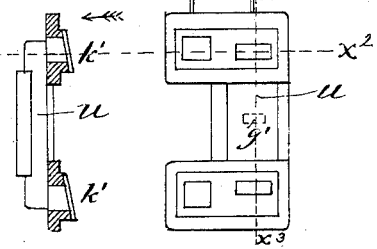
WITNESSES:
Chas. J. Howell
C. Sedgwick
INVENTOR:
C. Rohn
BY Munn & Co
ATTORNEYS.

(No Model.) 5 Sheets—Sheet 5.

C. ROHN.
GAS ENGINE.

No. 280,083. Patented June 26, 1883.

WITNESSES: INVENTOR:

UNITED STATES PATENT OFFICE.

CHRISTIAN ROHN, OF HARTFORD, CONNECTICUT.

GAS-ENGINE.

SPECIFICATION forming part of Letters Patent No. 280,083, dated June 26, 1883.

Application filed March 8, 1883. (No model.)

*To all whom it may concern:*

Be it known that I, CHRISTIAN ROHN, of Hartford, in the county of Hartford and State of Connecticut, have invented a new and useful Improvement in Gas-Engines, of which the following is a full, clear, and exact description.

My invention relates to contrivances for producing a double-acting gas-engine using mixed air and gas, which are mixed and compressed before being supplied to the cylinder, and are again compressed therein before ignition, the object being to provide gas-engines capable of much higher service than as heretofore made.

The invention consists of the combination and arrangement of parts, substantially as hereinafter fully set forth and claimed.

Reference is to be had to the accompanying drawings, forming part of this specification, in which similar letters of reference indicate corresponding parts in all the figures.

Figure 13:
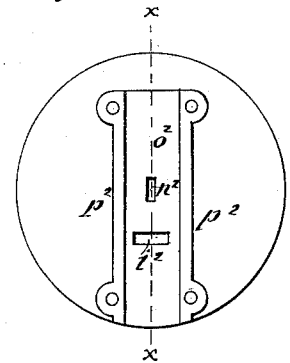
Figure 14:
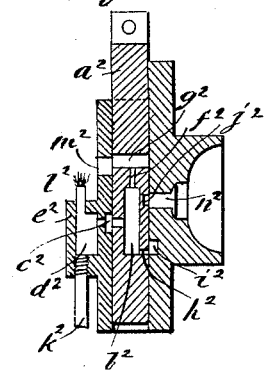
Figure 15:
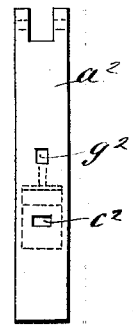
Figure 16:
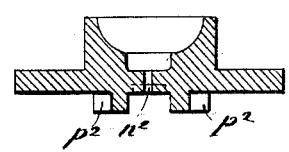
Figure 17:
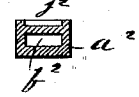
Figure 20:
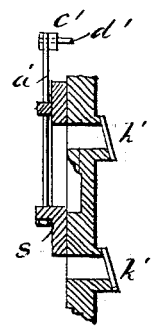

Figure 1 is a side elevation of my improved gas-engine. Fig. 2 is a plan view. Fig. 3 is an end elevation. Fig. 4 is a horizontal section of the cylinder of the engine. Fig. 5 is a transverse section on line $x$ $x$ of Fig. 4. Fig. 6 is a longitudinal sectional elevation of the packing for the piston-rod. Figs. 7, 8, and 9 are details of the piston-rod packing in section. Fig. 10 is a plan view of one of the cylinder-ports. Fig. 11 is a section of the cylinder through one of the ports and the valve. Fig. 12 is a plan view of one of the valves. Fig. 13 is an elevation of a cylinder-head, showing the seat for the ignition-valve. Fig. 14 is a section of the cylinder-head and ignition-valve, taken on the line $x$ $x$ of Fig. 13. Fig. 15 is an elevation of the ignition-valve. Fig. 16 is a horizontal section of the cylinder-head shown in elevation in Fig. 13. Fig. 17 is a cross-section of the ignition-valve. Fig. 18 is a sectional elevation of the apparatus for mixing and compressing the air preparatory to supplying it to the engine-cylinder. Fig. 18ª is a transverse section of the said mixing and compressing apparatus on the line $x'$ $x'$, Fig. 18. Fig. 19 is an inside elevation of the valve-seats of the valves regulating the supply of air and gas to the mixer and compressor, as seen in the direction of the arrow, Fig. 19ᵇ. Fig. 19ª is a transverse section on line $x^2$ $x^2$ of Figs. 19 and 19ᵇ. Fig. 19ᵇ is a vertical section of Figs. 19 and 19ª, on line $x^3$ $x^3$, through the gas throttle or suction valve to the compressor. Fig. 20 is a section of Figs. 19 and 19ᵇ through the air throttle or suction valve. Figs. 21 to 24, inclusive, are motion diagrams illustrative of the working of the valves.

Referring to Figs. 1, 2, and 3, the engine may be generally described as follows:

$a$ represents the working-cylinder, mounted on the bed-frame $b$, with its piston-rod $c$ and connecting-rod $d$, connected with the crank-shaft $e$, carrying the fly-wheel $f$; the eccentric $g$, for working the inlet-valve $h$ for the compressed air; eccentric $i$, for working the ignition-valves $j$ $k$; eccentric $l$, for the exhaust-valve $m$; connecting-rod $n$, for working the piston of the compressor, and the eccentric $p$, for working the gas-inlet valve $q$. Common illuminating-gas of any approved kind is supplied to the chamber of the valve-chest $r$ in any approved way, from which it passes into the gas-passage $u$ of the compressor through slide-valve $q$, and subject to the control of a regulating-valve, $w$, under the control of the governor $x$; and a valve, $s$, employed for admitting fresh air to the compressor, is under the control of the governor, to regulate the amount of fresh air in proportion to the load and speed of the engine, said valve, and also the gas-regulating valve $w$, being connected by their rods $a'$ $b'$ to arms $c'$ of a rock-shaft, $d'$, which is connected to the governor by the rod $f'$.

The valve $q$ for the gas consists of a flat plate with a slot through it, and works between the port-face of the valve-chest and the port-face of the compressor, each having a slot, and all making a direct passage, $g'$, into the compressor, when they coincide, as represented in Fig. 18. The valve-chest $v$ is connected by bolts $h'$, having a spring, $i'$, under them to prevent binding the valve $q$, at the same time holding it gas-tight. With these valves it will be seen that the gas and air may be admitted in the required proportions for mixing properly, and at the same time be regulated in quantity, according to the labor it is required that the engine shall do.

Figure 23:
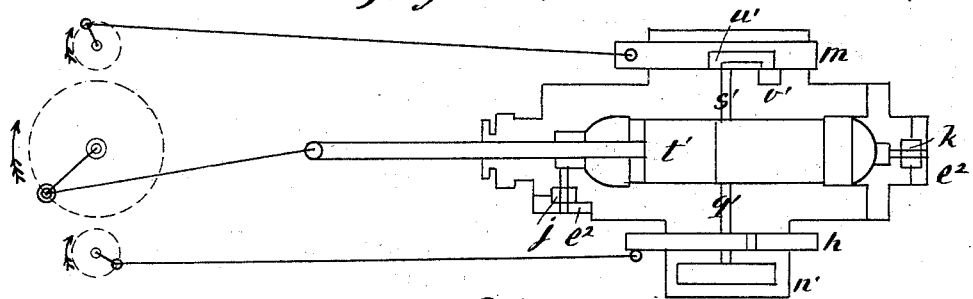
Figure 24:
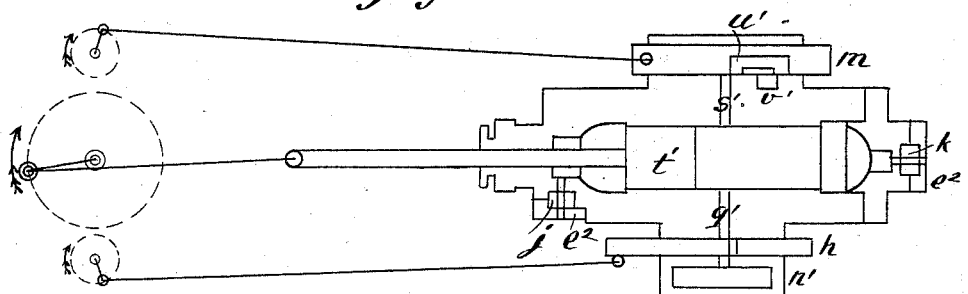

The cylinder $j'$ of the air-compressor and its piston $o$ are constructed for double action, and provided with the requisite duplicate suction-valves $k'$ for air and gas, Figs. 19$^b$ and 20, and one set of delivery-valves, $l'$, by which the mixed and compressed gas and air are delivered to the chamber of the valve-chest $n'$ of cylinder $a$ through the connecting-pipe $o'$, in which is a throttle, $p'$, subject to the control of the governor $x$. The inlet-valve $h$ for the cylinder $a$ is, like the valve $q$, a simple flat plate with a slot through it, and fitted between the port of valve-chest $n'$ and the port-face of the cylinder, so that it opens a straight passage, $q'$, into the cylinder, when its slot coincides with the others. Similar bolts, $h'$, and springs $i'$ are employed to secure the valve-chest and valve, as in the case of the compressor. The inlet-port $q'$ enters the cylinder at the center between the ends of the cylinder, and the exhaust $s'$ is similarly situated on the opposite side of the cylinder; but the exhaust-valve $m$ has an exhaust-cavity, $u'$, discharging into the cavity $v'$ of the cylinder leading to the exhaust-pipe $a^5$. For a simple method of making these ports $q'$ and $s'$ in the cylinder, and also to provide cross-bars or bridges $w'$, to wear even and enable the piston-packing to pass over without obstruction, I prefer to bore a series of holes, instead of coring them out in the molds, as represented in Figs. 10 and 11. The port in the valve $h$ has a width corresponding to the desired cut-off or time of admission, and its eccentric is to be set to open the inlet to the front end of the cylinder when passing from 1 to 1, Fig. 21, which is during the fastest travel of the valve and just before the piston $t'$ arrives at the back end of its stroke. When the valve closes the inlet to the front end of the cylinder, the piston and valve will be in the positions represented in Fig. 22, the piston then being on the return-stroke. As soon as the inlet is closed compression begins on the mixed air and gas then filling the cylinder, and is continued till the piston reaches the end of its stroke, when the ignition-valve $j$ opens, admitting a flame of burning gas, which ignites and consumes the gas contained in the compressed air in the cylinder, and thereby heating the air and increasing the pressure in the measure corresponding to the temperature produced by the combustion of the gas and the pressure of the air and gas at the moment the gas was ignited, the increased pressure of the heated air driving the piston toward the other end of the cylinder. When the piston has arrived about as far on the forward stroke as represented in Fig. 23, the exhaust-valve $m$ opens for the exhaust of the spent hot air in the back end of the cylinder, and when the exhaust-valve is wide open and most of the spent hot air exhausted a small valve (not shown, but to be situated on the front end of the cylinder) will in practice be used to open and admit a small quantity of compressed air well charged with aqueous vapor to drive out the rest of the hot gas before the inlet-valve opens to admit a fresh supply of the mixed air and gas, said valve to be operated by any approved means. The operations are the same for the other end of the cylinder—that is to say, when the valves and piston are in the positions represented in Fig. 24, the inlet-valve opens for the supply of the back end of the cylinder while the eccentric is traveling from 2 to 2, Fig. 21. The mixture is then compressed as before until the piston arrives at the back end. The ignition-valve $k$ then opens, the gas contained in the air is ignited and consumed, the air heated, and the increased pressure behind the piston drives it forward again till its pressure is exhausted. When the exhaust-valve is wide open for the exhaust from the front end of the cylinder, another small valve, (not shown,) situated on the back end, is to open and admit a small quantity of compressed air to drive out the rest of the spent hot air, same as for the other end. The exhaust-valve $m$ is, like the inlet-valve, confined to its port face, by its chest-cover $m'$, by bolts $h'$ and springs $i'$. The ignition-valves $j$ and $k$ consist of a plain bar, $a^2$, having a gas-chamber, $b^2$, into which gas is admitted through ports $c^2$ from the chamber $d^2$ in the cover $e^2$, and from which it issues through a small hole, $f^2$, to the combustion-chamber $g^2$; and there is a small passage, $h^2$, from said chamber $b^2$ into a recess, $i^2$, in the port-face of the cylinder, on which the valve works, and a recess, $j^2$, in the face of the valve, working on said port-face. A jet of the gas, which is supplied to chamber $d^2$ by a pipe, $k^2$, is continuously burning at $l^2$, exterior to the cylinder, which ignites the gas in chamber $g^2$ through opening $m^2$ in the chest-cover when the valve is in the position opening chamber $g^2$ to it. The flame continues in chamber $g^2$ long enough after the valve has descended, to cut off opening $m^2$ for chamber $g^2$ to open into the passage $n^2$, communicating with the interior of the cylinder, and ignites the gas therein. The object of the chamber $i^2$ is to receive a small quantity of the combustible gas to be transferred by chamber $j^2$ to the opening $n^2$, for greater certainty of ignition of the mixed air and gas in the cylinder.

For the back end of the cylinder the port-face $o^2$, on which the igniting-valve works, is arranged on the cylinder-cover between guides $p^2$; but for the front end of the cylinder the valve has to be provided for on the side of the cylinder, in consequence of the end being occupied by the piston-rod and stuffing-box. In both cases the ignition-valves are confined by covers $e^2$, bolted on with bolts $h'$ and springs $i'$, in the same manner as the other valves are. The ignition-valves are connected to the rockers $q^2$, which are connected together by the rod $s^2$, and connected to eccentric $i$ by rod $t^2$, the rockers being arranged reversely to each other as to the projection of their arms $w^2$, to which the valves are connected, so that one rises while the other descends in unison with the movements of the piston. These valves are to be geared so that they open the combustion-chambers $g^2$ to the cylinder when the crank is passing the centers.

To obtain a perfectly air-tight packing for the piston-rod, which is absolutely required to make this engine double-acting, I have contrived a combined metallic and hydraulic packing, which, besides being air-tight, reduces the friction to a small amount as compared with other packing, and is as follows: I make a bush, $a^3$, to fit in the bottom of the stuffing-box $b^3$, said bush being chambered at $c^3$, Fig. 7, to receive common metallic ring-packing $d^3$ in the bottom of the chamber, to be set up by the inner end of a sleeve, $e^3$, having a collar, $f^3$, fitting the bore of the stuffing-box, between which collar and the end of the gland $g^3$ other metallic packing, $h^3$, is arranged; and between the outer end of this sleeve and the bottom of the chamber $i^3$ of the gland is still another set of metallic packing-rings, $j^3$, all of which rings are set up by the gland; and I chamber the sleeves $e^3$, as at $k^3$, and connect said chamber with a pipe, $l^3$, from a hydraulic pump and another pipe, $m^3$, for letting off the fluid by openings $n^3$ at the space between the end of bush $a^3$ and the shoulder $f^3$. The gland is pressed in to keep the packing tight by springs $o^3$ on the bolts $p^3$ in case the packing is to work automatically. The packing-rings $d^3$ at the bottom and $j^3$ in the chamber of the gland prevent any escape of the fluid between the rings. The sleeve $e^3$ between these two packings serves to compress and hold the packing-rings in contact with the rod, besides containing the chamber for the fluid-packing, said chamber being turned out in the sleeve just enough larger than the piston-rod to contain a thin film of water. The annular water-space $q^3$ between collar $f^3$ and the end of bush $a^3$ is to prevent any air escaping around the sleeve. The water is to be allowed to circulate through the packing-box and pass off at $x^4$ to the water-jacket of the cylinder, to keep the box cool, a relief-valve being employed to regulate the escape, the valve being held down by a spiral spring. This improved packing, especially required in the engine, is also useful for steam, air, gas, water, and other engines. I also use oil under pressure for the hydraulic packing, without making it circulate, which is preferable for small gas-engines and for other engines.

To properly regulate the speed of the engine to correspond to the load, I use a governor, as before stated, which may be of the same kind as used in a steam-engine, the throttle-valve of the engine and also the throttle of the compressor being connected to it. As the speed of and load on the engine vary, the governor will open or close the throttle-valve $p'$ and increase or diminish the supply of mixed air and gas to the engine, which will correspondingly vary the pressure of the compressed air in the cylinder before being heated, which correspondingly varies the working pressure, thus regulating the speed. In like manner the operation of the throttle-valve on the compressor regulates the compression, and thus uniformity between the compressor and the engine is maintained.

By compressing and heating air by mixing gas in it in such proportions that a flame will pass through it and heat it at once when ignited, a much higher working pressure can be obtained than by any other known means; and as a cylinder of an engine can be so constructed that it can sustain a much higher working pressure than can with safety be produced in a steam-boiler, and by the direct double-acting principle practically utilized in an engine I have provided such an engine capable of much higher duty than any other gas, air, or steam engine, and calculated to be more safe and useful than steam-engines or engines of any existing kind, as it does away with steam-boilers and all dangerous work and trouble connected with the use of steam.

It is also to be noted that, as all valves in this engine are driven directly from the crank-shaft with eccentrics, it can be made reversible by the same kind of reversing-gear as used in a steam-engine, and thus be made useful for any purpose where steam is used.

It is also to be noted that, as in this improved engine the working pressure is regulated by the governor and throttle-valve on the valve-chest of the engine, compressed air of a steady pressure, compressed in any suitable compressor connected with, as hereinbefore described, or disconnected from, the engine, can be used, which simplifies and makes these engines more useful.

It is also to be noted that in this improved engine all the heat developed by the combustion of the gas takes effect on the air employed for producing expansive force, the air is exposed directly to and acted on by the flame, thereby utilizing the heat of the flame before radiation takes place.

As a small cylinder can be made to sustain a much higher pressure than a large one, and it is advantageous to use high working pressure, as it reduces the consumption of gas in proportion, I first heat and partly expand the vapor in a small cylinder, and then complete the expansion in a larger one, for which purpose I propose to add a working-cylinder of the same kind as used in steam-engines to the engine hereinbefore described, for compounding it, so that, as a larger volume of vapor can be heated at once in a cylinder without increasing the friction and number and size of working parts than can be expanded in that cylinder, a larger measure of effect than can be obtained from it in the small one will be developed by the use of the two.

While I have described my improved engine as a gas-engine, because so called, I maintain that it is properly a hot-air engine using gas as fuel and hot air as the motive power, the air being heated by the combustion of the gas within the air, the gas and air being mixed in such proportions that when compressed in the cylinder and the gas ignited a flame will pass through the air the gas is mixed with, heating it at once, and thereby utilizing all the heat developed by the combustion of the gas.

I further reserve the right to constitute the features shown in Figs. 6, 7, 8, and 9 as the subject of a separate application.

Having thus described my invention, I claim as new and desire to secure by Letters Patent—

1. A gas-engine having inlet and exhaust ports located centrally between the ends of the cylinder, and inlet and exhaust valves therewith, that effect distribution and exhaust of the motive vapor at both ends of the cylinder and both sides of the piston alternately, substantially as described.

2. A gas-engine having inlet and exhaust ports located centrally between the ends of the cylinder, and inlet and exhaust valves therewith, that effect distribution and exhaust of the motive vapor at both ends of the cylinder and both sides of the piston, and also having ignition-valves at both ends of the cylinder, substantially as described.

3. A gas-engine having inlet and exhaust ports located centrally between the ends of the cylinder, with valves for controlling the same, the arrangement being such that the inlet opens to the exhausted space behind the piston, and the charge of motive vapor admitted thereto is compressed by the return-stroke of the piston prior to ignition, substantially as described.

4. The combination, in a motive-engine, of a gas and air mixer and compressor, and a gas-engine provided with inlet and exhaust and ignition valves, and said compressor and gas-engine having throttle-valves connected with and controlled by one and the same governor, substantially as described.

5. The combination, with the cylinder $a$, of a gas-engine having inlet and exhaust ports located centrally between the ends of the cylinder, of the inlet-valve $h$, having port $q'$, and the exhaust-valve $m$, having chamber $u'$, substantially as described.

6. The combination, with a gas-engine cylinder, $a$, having the inlet-port located centrally between the ends of the cylinder, of an inlet slide-valve, $h$, having a single passage, $q'$, and being geared and arranged to admit the motive vapor alike into the empty space behind the piston on both forward and backward strokes, substantially as described.

7. The combination, with a gas-engine cylinder, $a$, having the exhaust-port located centrally between the ends of the cylinder, of the exhaust-valve $m$, having the exhaust-cavity $u'$, and being geared and arranged to exhaust alike from both sides of the piston after the piston has passed the port, and to close the same prior to the return of the piston and before the opening of the inlet-valve, substantially as described.

8. The combination, with a gas-engine having inlet and exhaust ports located centrally between the ends of the cylinder, of the inlet-valve $h$, having a single passage, and the exhaust-valve $m$, having exhaust-cavity $u'$, the said exhaust-valve being arranged to open the exhaust behind the piston and close it again, and the inlet-valve arranged to admit the motive vapor behind the piston and before its return, and both of said valves being alike operative on both sides of the piston, substantially as described.

9. The ignition-valve consisting of a sliding bar, $a^2$, having a gas-chamber, $b^2$, passages $c^2$ and $f^2$, and combustion-chamber $g^2$, substantially as described.

10. The ignition-valve consisting of a sliding bar, $a^2$, having a gas-chamber, $b^2$, passages $c^2$ and $f^2$, combustion-chamber $g^2$, passage $h^2$, and chamber $j^2$, substantially as described.

11. The combination of the ignition-valve, having gas-chamber $b^2$, passages $c^2$ and $f^2$, and combustion-chamber $g^2$, with the cover $e^2$, having chamber $d^2$ and burner $l^2$, substantially as described.

12. The combination of the ignition-valve, having gas-chamber $b^2$, passages $c^2$ and $f^2$, and combustion-chamber $g^2$, with the cover $e^2$, having chamber $d^2$ and burner $l^2$, and with the cylinder $a$, having opening $n^2$, substantially as described.

13. The combination of the ignition-valve, having gas-chamber $b^2$, passages $c^2$ and $f^2$, combustion-chamber $g^2$, passage $h^2$, and cavity $j^2$, with the cylinder $a$, having opening $n^2$ and chamber $i^2$, substantially as described.

14. The combination of the ignition-valve, having gas-chamber $b^2$, passages $c^2$, $f^2$, and $h^2$, combustion-chamber $g^2$, and cavity $j^2$, with the cover having gas-chamber $d^2$ and burner $l^2$, and with the cylinder $a$, having opening $n^2$ and chamber $i^2$, substantially as described.

15. The combination, with the cylinder $a$, having an outside gas-flame, $l$, and an opening, $n^2$, into the interior of the cylinder, of an ignition-valve having a combustion-chamber communicating with the flame for ignition of the gas within it, and then, after cutting off said communication with the gas-flame, opening communication with the interior of the cylinder through said opening $n^2$, and means, substantially as described, to supply the latter with an additional quantity of mixed air and gas to insure certainty of ignition, substantially as described.

16. An ignition-valve having a combustion-chamber, first communicating with a gas-flame for igniting the gas in said chamber, and then communicating with the cylinder for igniting the gas therein, and being provided with a chamber, $j^2$, that receives and delivers a measure of unmixed gas to the ignition-opening to the cylinder subsequently to the inlet of motive vapor to the cylinder and prior to the communication of the combustion-chamber of the valve with the vapor in the cylinder, substantially as described.

17. An ignition-valve having a combustion-chamber, first communicating with a gas-flame for igniting the gas in said chamber, and then communicating with the cylinder for igniting the gas therein, and being provided with a chamber, $j^2$, and a passage, $h^2$, communicating with an additional gas and air supply chamber, $i^2$, substantially as and for the purpose set forth.

18. The combination of gas slide-valve $q$ and the gas and air throttle valves $w$ and $s$ with the gas and air mixer, substantially as described.

CHRISTIAN ROHN.

Witnesses:
 EDWARD M. BLISS,
 S. W. ADAMS.